Nov. 3, 1925.  
T. LUBBEN  
1,560,179  
DRYING RACK FOR SEED CORN AND THE LIKE  
Filed Dec. 9, 1924   2 Sheets-Sheet 1

Theodore Lubben  
INVENTOR

WITNESSES

Nov. 3, 1925.  
T. LUBBEN  
1,560,179  
DRYING RACK FOR SEED CORN AND THE LIKE  
Filed Dec. 9, 1924  2 Sheets-Sheet 2
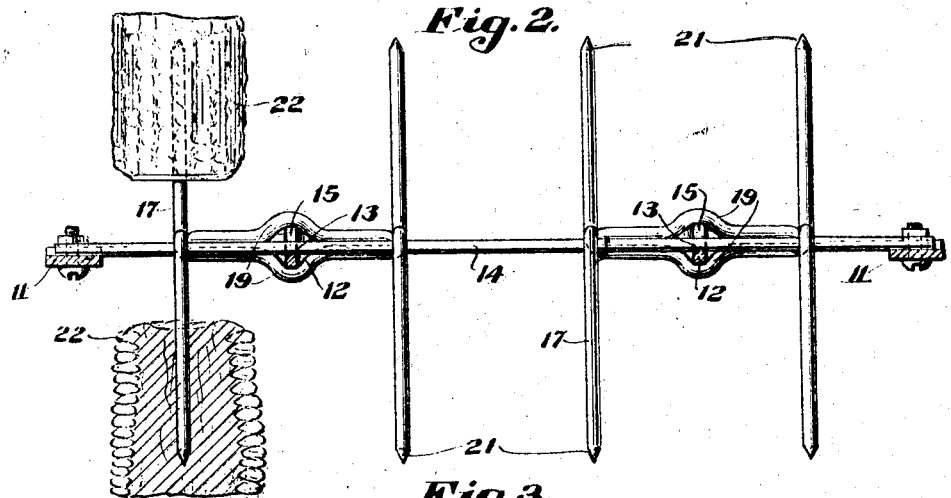
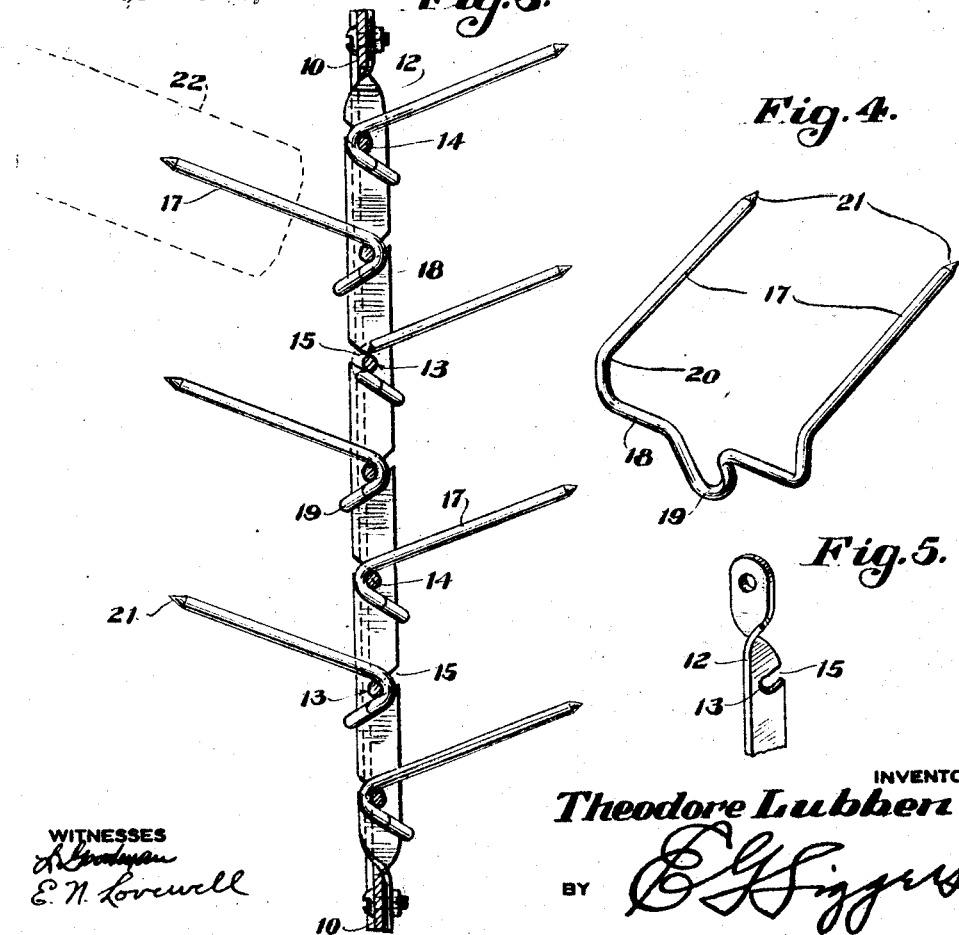
INVENTOR  
Theodore Lubben Patented Nov. 3, 1925.

1,560,179

UNITED STATES PATENT OFFICE.

THEODORE LUBBEN, OF CLARINDA, IOWA.

DRYING RACK FOR SEED CORN AND THE LIKE.

Application filed December 9, 1924. Serial No. 754,803.

*To all whom it may concern:*

Be it known that I, THEODORE LUBBEN, a citizen of the United States, residing at Clarinda, in the county of Page and State of Iowa, have invented a new and useful Drying Rack for Seed Corn and the like, of which the following is a specification.

This invention relates to a rack adapted to be used in drying ears of seed corn and the like.

The object of the invention is to provide a rack of simple and improved construction, having prongs on which the ears of corn may be impaled endwise, so that they may be held in spaced relation, permitting a free circulation of air between and around them while drying. In the preferred form of the invention, the prongs are connected in pairs and detachably supported in such a manner that the weight of the corn serves to prevent their displacement.

The detailed construction of the rack and the manner in which it is used will be more specifically explained in connection with the accompanying drawings, which illustrate the invention in its preferred form.

In the drawings:

Figure 2 is a horizontal section thereof.

Figure 3 is a vertical section.

Figure 4 is a perspective view of a pair of prongs detached.

Figure 5 is a detail perspective view of a portion of one of the perforated bars.

Figure 1:
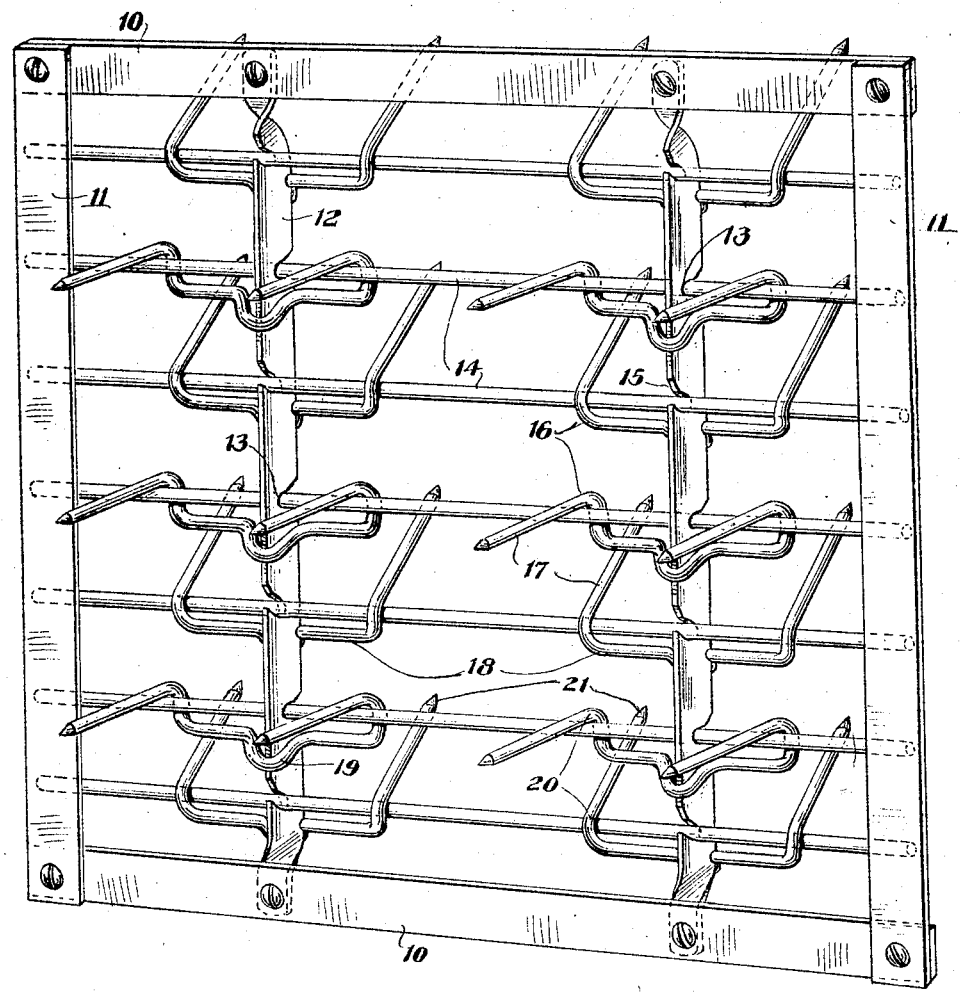
Figure 1 is a perspective view of the invention.

The rack comprises a rectangular frame having top and bottom rails 10 and end rails 11, and adapted to be supported in upright position by any suitable means. The frame is traversed from top to bottom by a number of flat bars 12, the frame being made of a sufficient size to accommodate the number of bars desired. The bars 12, except at the ends where they are attached to the rails 10, are disposed in planes substantially perpendicular to the plane of the main frame, and are provided with series of notches 13, the notches in one bar being substantially in horizontal alinement with the corresponding notches in the other bar, or bars, so as to receive removable rods 14. The notches 13 may be formed with a small file by cutting slots 15 from the side edge of the bar 12. The width of these slots may not be as great as the diameter of the rods 14. The flat end rails 11 are at one side of the plane of the notches 13, so that the rods 14 may be inserted endwise, leaving the ends of the rods underneath the end rails.

The series of yokes 16 are adapted to be detachably supported by the rods 14 in conjunction with the bars 12, each yoke being provided with a pair of prongs 17 for supporting the ears of corn. The prongs 17 are connected by a web portion 18, which is formed centrally with a loop 19 adapted to engage one edge of the bar 12, and the prongs 17 are bent downwardly at 20 forming seats which rest against the upper side of the rod 14. Each prong 17 has a sharp point 21 upon which the end of the ear 22 may be impaled.

In mounting the ears of corn in position for drying, it is most convenient to impale the ears upon the prongs 17, and then holding the same in the proper position, to insert the rod 14 underneath the bent portions 20. The weight of the corn will then cause the loop 19 to bear against the edge of the bar 12 and prevent displacement of the prongs. The prongs 17 are preferably arranged to extend alternately from opposite faces of the rack, as shown in Figure 3, so as to conserve space, and so that the ears of corn on one side will substantially balance those on the other side. When supported in this manner, each ear will be supported out of contact with the neighboring ears, thus insuring a free circulation of air, so that the kernels may be uniformly dried in a manner to preserve their vitality, and to insure their germination when planted.

While I have shown and described in detail the preferred form of the invention, it is apparent that the same is capable of various modifications in the size, shape and relative arrangement of the various elements without sacrificing any of the salient features of the invention. It is my intention therefore to include all such modifications within the scope of the appended claims.

What is claimed is:

1. A drying rack comprising a frame with bars extending across the same, rods supported transversely of the bars, and yokes supported at the intersections of the bars and rods each yoke having a loop for receiving the bar, and prongs with their outer ends bent so as to embrace the rod and to extend laterally therefrom, whereby the weight of the ears supported by said prongs holds the loop in engagement with the bar.

2. A drying rack comprising a rectangular frame adapted to be supported in a substantially vertical plane with bars extending from top to bottom of the frame, rods removably supported in perpendicular relation to the bars, and yokes removably supported at the intersections of the bars and rods, each yoke having a loop for receiving the bar, and parallel prongs with their outer ends bent so as to embrace the rod and to extend laterally therefrom, whereby the weight of the ears supported by said prongs holds the loop in engagement with the bar.

3. A drying rack comprising a frame with bars extending from top to bottom thereof and having series of notches, the notches of one bar being in horizontal alinement with the notches of the other bar, rods insertible endwise into the alined notches, and yokes at the respective intersections of the rods and bars, each yoke having a loop for receiving the bar, and prongs with their outer ends bent so as to pass about the rod and rest thereon, said prongs extending laterally from the frame to receive ears of corn, the weight of which holds the loop in engagement with the bar.

4. A drying rack for ears of corn comprising a frame, a series of prongs arranged in pairs, with the prongs of each pair integrally connected by a yoke, rods over which the prongs are bent, and abutment bars against which the yokes are held by the weight of the ears when the latter are secured to the outer portions of the prongs.

5. A drying rack for ears of corn comprising a substantially rectangular frame adapted to be supported in upright position, a series of prongs arranged in pairs with the prongs of each pair integrally connected by a yoke, horizontal rods removably supported by the frame over which the prongs are bent, and flat bars extending from top to bottom of the frame in substantially vertical planes perpendicular to the plane of the frame, the yokes having loops formed therein for receiving the bars, said loops being held in engagement with the bars by the weight of the ears when the latter are secured to the outer portions of the prongs.

6. A drying rack comprising a frame, spaced bars extending across the same and connected thereto, spaced removable rods supported by the said bars where they cross the latter, and yokes engaging the said bars and rods and holding the same in engagement and provided with outstanding prongs to engage the ears of corn.

7. A drying rack, comprising a frame, spaced bars extending across the same and rigidly connected thereto, spaced removable rods arranged at right angles to the said bars and crossing the latter and engaging the bars where they cross, and yokes engaging the said bars and rods and holding the said parts in engagement and provided with outstanding prongs to engage the ears of corn, said yokes extending in opposite directions alternately along said bars.

In testimony that I claim the foregoing as my own, I have hereto affixed my signature.

THEODORE LUBBEN.